United States Patent

[11] 3,631,793

| [72] | Inventor | Hugo Bednartz<br>Deichstr. 26, 295 Leer, Germany |
|---|---|---|
| [21] | Appl. No. | 835,375 |
| [22] | Filed | June 23, 1969 |
| [45] | Patented | Jan. 4, 1972 |
| [32] | Priority | June 21, 1968 |
| [33] | | Germany |
| [31] | | P 17 78 935.4 |

[54] VESSEL INSERT FOR THE PREPARATION OF BEVERAGES
10 Claims, 11 Drawing Figs.

[52] U.S. Cl. .................................................. 99/295, 210/348 R
[51] Int. Cl. ............................................. A47j 31/18
[50] Field of Search ........................................... 99/295, 320–323, 77.1

[56] References Cited
UNITED STATES PATENTS

| 1,317,447 | 9/1919 | Holt | 99/323 X |
| 2,426,720 | 9/1947 | Weinberg | 99/295 X |
| 2,885,290 | 5/1959 | Krasker | 99/77.1 |
| 2,887,037 | 5/1959 | Setecka | 99/295 |
| 3,446,624 | 5/1969 | Luedtke | 99/295 X |
| 3,483,812 | 12/1969 | Gast et al. | 99/295 |

Primary Examiner—Marvin A. Champion
Assistant Examiner—Terrell P. Lewis
Attorney—Allison C. Collard ABSTRACT: An insert for the infusion and filtering of beverages having residual matter such as coffee and tea, consisting of a retaining unit which is capable of being seated in the top portion of the vessel, and a disposable inset for placement into the retaining unit. The disposable inset is constructed from fleece paper for containing tea leaves or coffee grounds while in contact with the solution within the vessel.

INVENTOR
Hugo BEDNARTZ
BY
his ATTORNEY

INVENTOR
Hugo BEDNARTZ
BY his ATTORNEY

INVENTOR
Hugo BEDNARTZ
BY
his ATTORNEY

INVENTOR
Hugo BEDNARTZ
BY
his ATTORNEY

PATENTED JAN 4 1972 3,631,793

INVENTOR
Hugo BEDNARTZ
BY his ATTORNEY

INVENTOR
Hugo BEDNARTZ
BY
his ATTORNEY

VESSEL INSERT FOR THE PREPARATION OF BEVERAGES

This invention relates to a pot filler for the preparation of beverages with residues and especially for making tea and coffee.

Tea is made either by putting loose tea leaves into the kettle, or by using a tea bag. One cannot meet high demands by infusing a tea bag since because of the lack of space in a tea bag, only finely grained teas with little flavor are generally used, or even only tea fannings.

Moreover, the tea confined to the cramped tea bag, cannot unfurl to its full spread. The bag evades infusion, since it is not entirely contacted by the hot water. During the seeping process, the tea bag swims on the surface, or drops down to the bottom. Consequently, the hot water does not have its full impact on the extractive matter. Furthermore, the extraction is hindered by the firm conglomeration of the leaves in a tiny space. Furthermore, consumer pays for tea in tea bags about twice as much as for tea in normal packing. For these reasons, the tea bag is often rejected in tea drinking areas.

The tea bag has become popular in areas where tea is not a customary drink, not only because of its practical manipulation, but especially because the housewife has no trouble with disposing of bothersome used tea leaves. In these areas, the many great disadvantages of the tea bag such as the lower quality tea at a higher price, are contended with because of the convenience.

Until now, tea can only be made well and cheaply by putting the loose leaves into the kettle, and pouring water on them. However, the disadvantage of this is that the loose tea leaves in the kettle are at first swept to the side of the kettle when infused with water so that the water is poured onto the bottom of the kettle and not on the tea leaves. The water thus cools off and loses its effect on the extract. Shortly after the infusion, the tea leaves, swelled up by the water absorption, settle down on the bottom of the kettle, further hampering the extract, since the leaves, lying on the bottom, are no longer sufficiently washed all around by the hot water. Moreover, when the tea is poured, the leaves that are lying on the bottom of the kettle and filled with extract, cause an unequally strong distribution of the extract to the individual cups, and the extract is not completely rinsed out. Another disadvantage is that it is very difficult to remove the tea leaves from the kettle and the tea sieve after they are soaked, in contrast to the tea bag. Furthermore, the discarded tea leaves dirty the sink. If the tea drinker desires to take the tea leaves out prematurely, he can do so only by pouring the tea from one cup into another. During the packing, and also when making the tea, fine tea particles accumulate, depending on the tea structure, especially when fine grain teas or fannings are used, and these pass through the sieve into the cup.

There are also tea kettles which are equipped with sieve inserts which, as a rule, are made of porcelain or glass. The tea leaves intended for infusion, are put into the sieve insert. These inserts have the advantage that the hot water poured directly on the tea leaves, and the leaves cannot evade contact with the water. However, this advantage becomes lost by the fact that the water quickly loses its intensity on the extract because it gives up additional warmth to the insert, and because further seeping is very much hindered by the small, thick-walled, laced insert. A further disadvantage is that the leaves adhere to the small, sievelike holes, making it difficult to remove them from the sieve insert.

Coffee is either filtered, infused, or the coffee grounds are placed loosely into the pot. As a rule, the filtering is done outside the pot. This has the disadvantage in that the flavor partly evaporates into space, and is lost. The fleece or soft paper, used for coffee filtering, gives the coffee an unsatisfactory paperlike taste. Coffee, filtered in the usual manner, cools off very quickly. The coffee grounds are not fully used up, and the filtering process takes a comparatively long time. The aforementioned details are valid also for other hot drinks with grounds.

The invention is based on the problem of making a better tea or similar drink cheaper, without having to give up the comfort of the tea bag. With regard to coffee infusion, the invention does away with the existing disadvantages of the known infusion methods by keeping their advantages.

This problem has been solved by using a pot filler, made of a firm fastener to be laid on or inside the pot into which is secured, a one-way insert that lets the water pass through, to permit convenient placement of the matter to be infused, for filtering, and for removing the used matter, after it is used up.

For coffee pots, the filler can be equipped with a bridge that either has elevations and recesses, or is bristlelike, and leads vertically into the insert.

The coffee grounds that reach the insert are thus loosened up, and are not hindered by presoaking in the first hot water infusion.

In solving the problem, consideration was taken in that the used up tea leaves or coffee grounds or the residues of other basic matter, in a contained state, could always be removed from the pot and thrown away by means of a disposable insert. For tea, the insert should be as thin and soft as possible while conveniently providing the tea extract cheaply. On the other hand, however, the insert should be capable of easy insertion, without much support, in pots having different size openings, and easily removed with the used up, heavy, water-absorbed infused material. By using conventional fleece paper, the difficulties become aggravated since due to its instability, a solid insert cannot be manufactured having sufficient surface area when placed on the bottom, such as by pleating and pasting, as required for good infusion.

With the device of the invention, it is possible to overcome the above-described by providing a convenient disposable insert. The fastening device permits the use of a simple, envelopelike flat bag as an insert, without a bottom or sides. These disposable inserts can be made cheaply by machine from the thinnest fleece paper that does not dissolve in water. Paper which has the weight of 12 to 16 g./m.$^2$ can be made without the need of complicated machinery.

The housewife will be able to obtain the necessary empty space required for a good infusion without difficulty, by inserting the fastener in the insert, or by inserting the insert into the fastener. Especially for tea, a sufficiently large, yet not enormous space is required for its full development. The insert is placed on a large surface. After the water infusion, the insert absorbs the water up to its top portion, clings to the fastener, and adheres to it. Because of the above-described effect, and because the fastener extends a few centimeters into the pot and protects the insert when the water is poured, the insert is not swept into the pot when infused. This is of special significance for fasteners without elasticity. Moreover, it is important for the fillers that the inserts reach at least up to the brim of the fastener, and that the fastener projects beyond the pot, so that the insert together with the fastener can be grasped and removed from the pot without breaking off the insert with the heavy, water-absorbed infused material.

By using a flat, envelope-shaped insert made of fleece paper, its opening is measured for the largest pot opening. For fasteners that go around the pot, the insert can be pinched and placed double around the width of the fastener in case the pot opening is small. The insert can also be placed inside the fastener. On bridgelike fasteners, the part of the insert which is folded over, must be held at its pleat, through the clamp effect of a bridge. These provisions are necessary in order to prevent the infused soaked material from getting into the superfluous part of the insert. Should this happen, it would be difficult to remove the insert with its contents out of the small pot opening.

It is therefore an object according to the present invention to provide a disposable beverage-infusing device for use with a vessel which includes a retaining unit and an inset for holding the beverage stock in contact with the liquid contained in the fluid.

It is still a further object according to the present invention to provide a disposable beverage-infusing device which is simple in design, easy to manufacture, and reliable in operation.

Other objects and features of the present invention will become apparent from the following detailed description considered in connection with the accompanying drawings which disclose several embodiments of the present invention. It is to be understood, however, that the drawing is designed for the purpose of illustration only, and not as a definition of the limits of the invention.

In the drawings, wherein similar reference characters denote similar elements throughout the several views.

Figure 1:
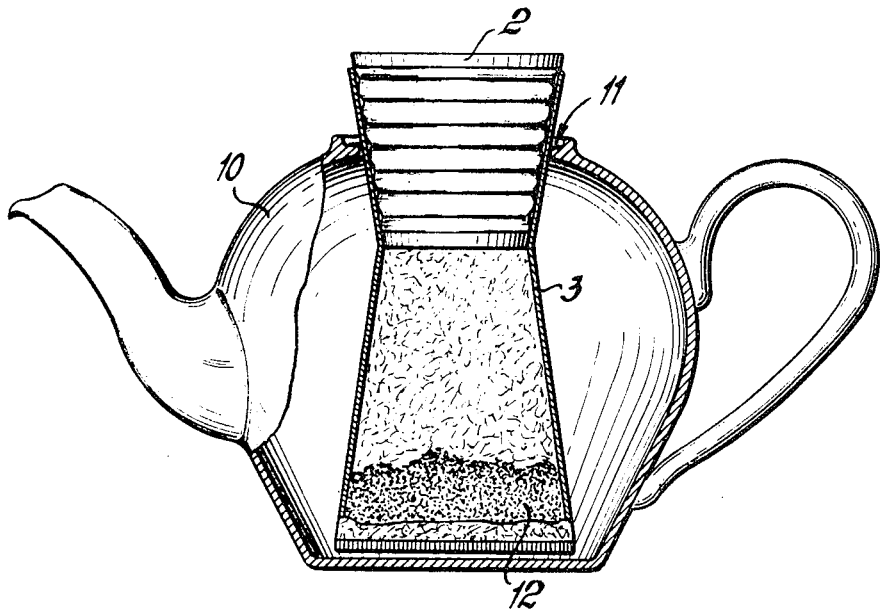
FIG. 1 shows a pot according to the invention with an inserted inset, a conical-retaining device, and a raised flat bag of blotting paper or fleece paper as an inset wherein the infusion stock intended for infusion is found.

Referring to FIG. 1 there is shown a conical-retaining device 2 which has been inserted into an inset 3. Inset 3 is constructed of wet-strength blotting or fleece paper, and is inserted into a standard teapot 10. With the aid of the coupling of retaining device 2 inset 3 can be conveniently and easily seated in the pot. Disposed in inset 3 is the infusion stock intended for the infusion 12. The hot water is directed to flow over the infusion stock 12 which is unable to escape the flow. The inset 3 cannot either be drawn downward when infusing, nor can it snap off when pouring since it is weighted with water-logged infusion stock. Drippage is impeded by the fact that inset 3 contacts device 2 over a large surface area on its entire outer wall. Moreover, because of the concentration of water inset 3 remains clamped between retaining unit 2 and pot 10, in the opening of the pot, so that retaining unit 2 projects a few centimeters into the pot, to protect inset 3 during infusion.

Figure 2:
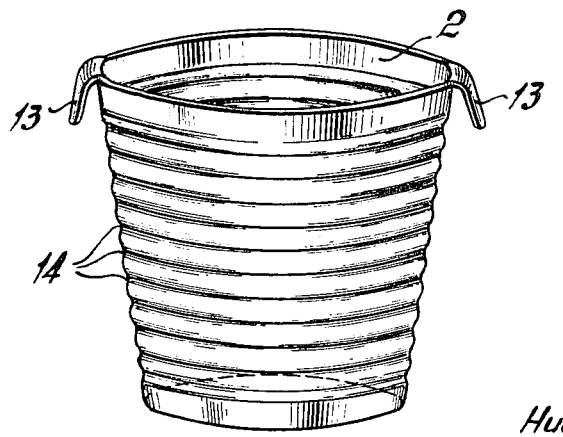
FIG. 2 shows a conical-retaining device according to FIG. 1, shown in a magnified scale with two tongues.

In FIG. 2, a conical-retaining device is shown for better adhesion in pot 10, and is provided with horizontal grooves 14, and also two tongues 13 which stand off, and which when pouring, afford a safeguard against the hot walls of the retaining unit.

Figure 3:
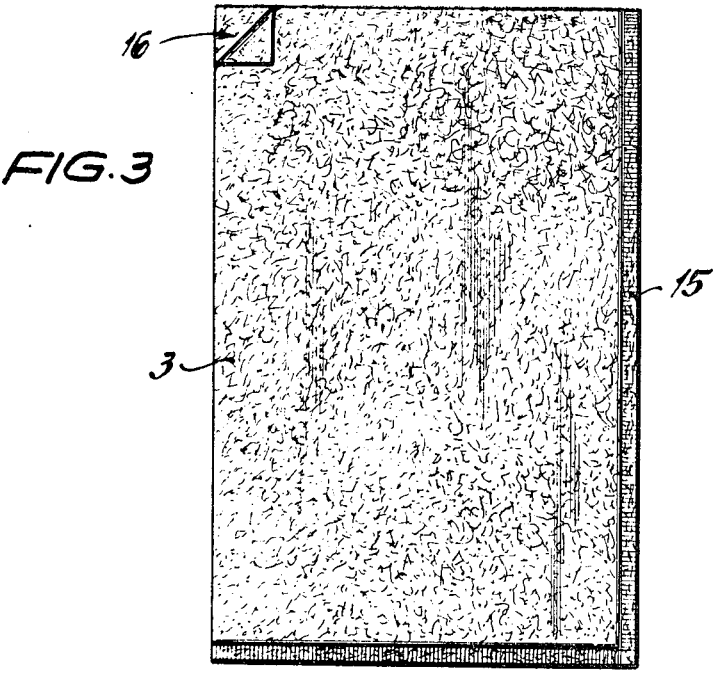
FIG. 3 is a curvilinear insert of blotting paper open at the top.

FIG. 3 shows an insert in the form of a curvilinear flat bag of wet-strength blotting paper provided with an aperture 16, wherein the crosswise and longitudinal seams 15 have been sealed by means of cogwheels, or compressed with the aid of a knurled wheel.

Figure 4:
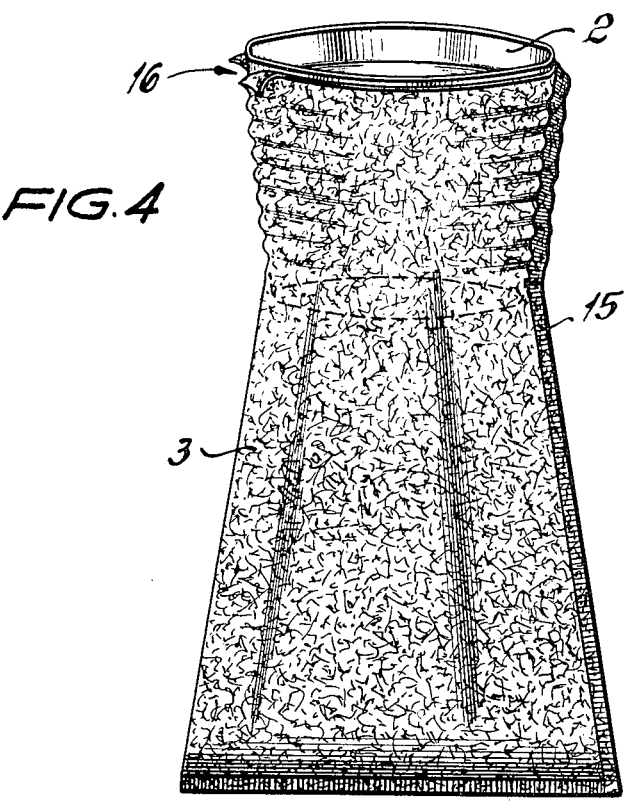
FIG. 4 shows the insertion of a conical retaining device into the curvilinear insert.

FIG. 4 shows a complete inset without a lid. The conical retaining unit 2 is introduced into aperture 16 of inset 3, and the latter is raised at least to the upper edge of the retaining unit 2. This causes the flat inset 3 to become deformed to assume the shape of a large hollow body, wherein, for example, the tea is able to attain a full expansion. The insert consisting of retaining unit 2 and inset 3 is seated in the pot and pressed down lightly. The infusion stock intended for infusion is then introduced, hot water is poured over it, and retaining unit 2 is closed with a lid.

Figure 5:
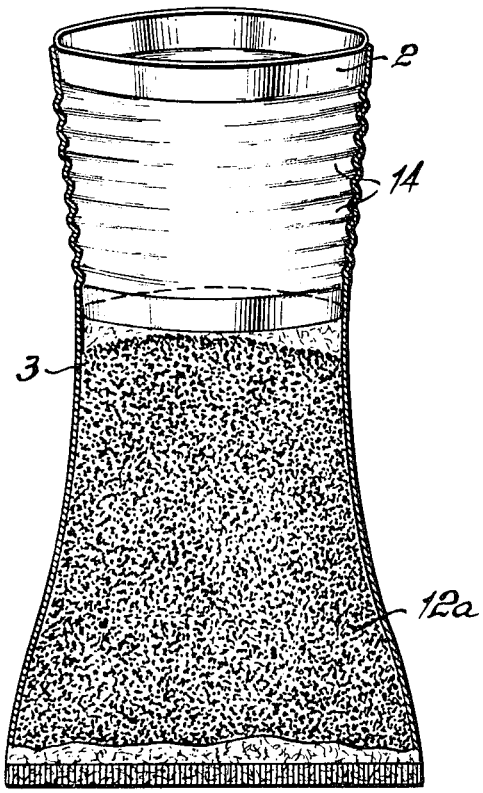
FIG. 5 shows the insert along with a conical-retaining device after removal from the pot with the leached out or extracted infusion stock.

FIG. 5 shows the withdrawn retaining unit 2 with an extracted or leached infusion stock 12a. Inset 3, with its extracted or leached infusion stock, is brushed away from retaining unit 2 and discarded.

Figure 6:
FIG. 6 shows a lid for one conical-retaining unit.

In FIG. 6 is shown a lid for retaining unit 2, provided with two opposite straps 13a which afford a safeguard against the hot walls of the retaining unit 2 when pouring.

Figure 7:
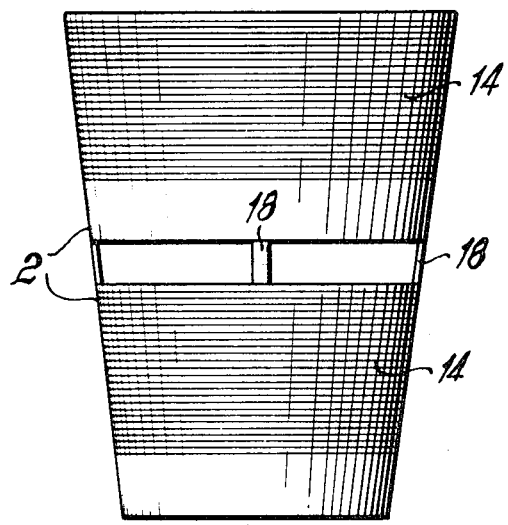
FIG. 7 shows two conical-retaining units which are strapped together.

Shown in FIG. 7 are two conical retaining units 2 which are joined together with the aid of straps 18. After the straps are removed, there remains two retaining units with different diameters, for use with a large number of pots with pot openings of diverse dimensions. If a third retaining unit is joined with the aid of straps to the assembly, then three retaining units exist after the straps are removed, so that it is possible to service all commercially available pots.

Figure 8:
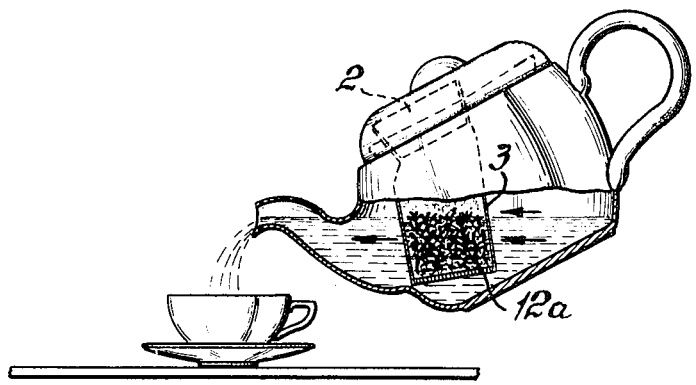
FIG. 8 shows a teapot designed to good advantage for the insert, complete with the insert, as the beverage is served.

FIG. 8 shows a fireproof, drip-proof teapot designed in accordance with the invention, with the inserted unit and conical-retaining unit in place while liquid is being poured. The lid for the retention has been dispensed with. The pot is oval. The inset is lodged in the anterior third of the pot. This has the advantage in that the inset, with the leaves which are saturated with the extract, becomes fully lodged before the pouring aperture of the pot and each cup is filled through the extract-saturated tea leaves.

Figure 9:
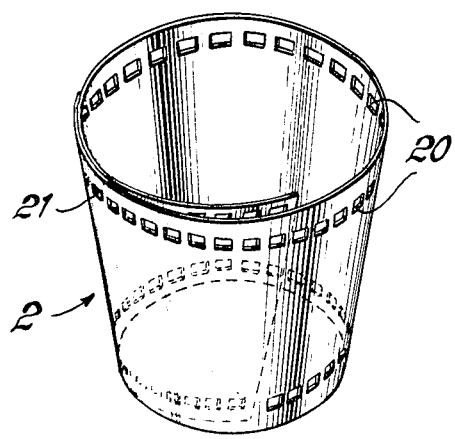
FIG. 9 shows a retaining unit open perpendicular at one point, said retaining unit being flexible, conical, and adjustable with respect to its circumference.

FIG. 9 shows a conical-retaining unit 2 which is open at both its top and bottom, and open along a vertical line. Unit 2 is preferably made of an elastic stock. Along its top and bottom edges are spaced-apart holes 20 similar to those found in film strips. On part of the opposite side of the edges are projections or bosses 21 capable of being snapped into holes 20. By telescoping the walls, and by selectively engaging the holes with the projections, the circumference of the retaining unit can be suitably adjusted for all pots.

Figure 10:
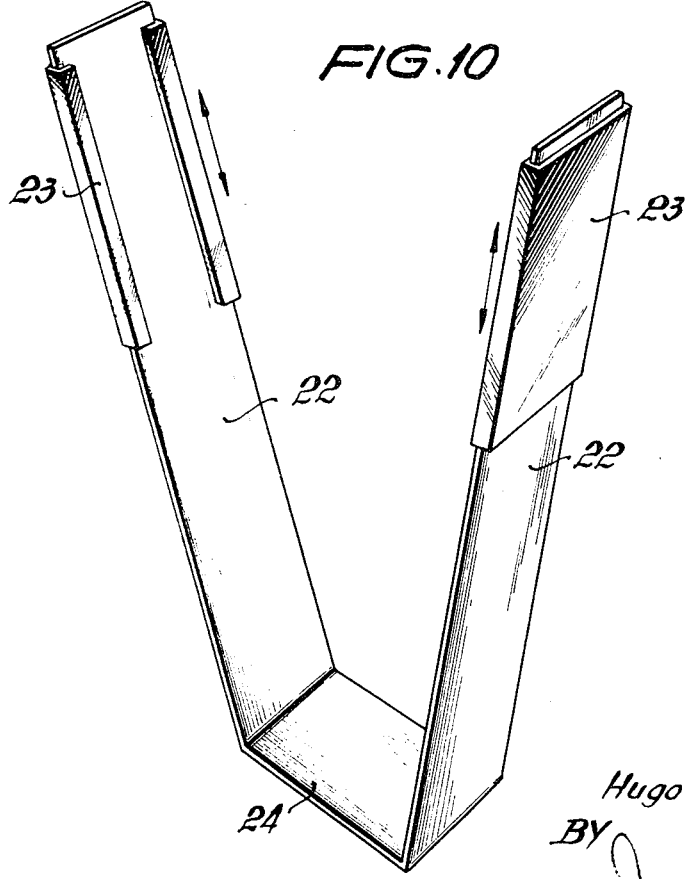
FIG. 10 shows a stepped retaining unit, devised with an outside twist, spring-loaded, and adjustable in height, with two webs exhibited at the bottom surface for disposal on the bottom of the pot; and, FIG. 11 shows the segmented retaining unit of FIG. 10 introduced into a flat bag of blotting paper which is provided with two slots at the top.
Figure 10:

FIG. 10 shows one retaining unit with two strips or arms 22 which are connected with the aid of bottom piece 24. Both strips 22 are adjustable in height by shifting the attached segments or strips 23. Strips 22 consist of a plastic stock, and the retaining unit is spread outward.

Figure 11:
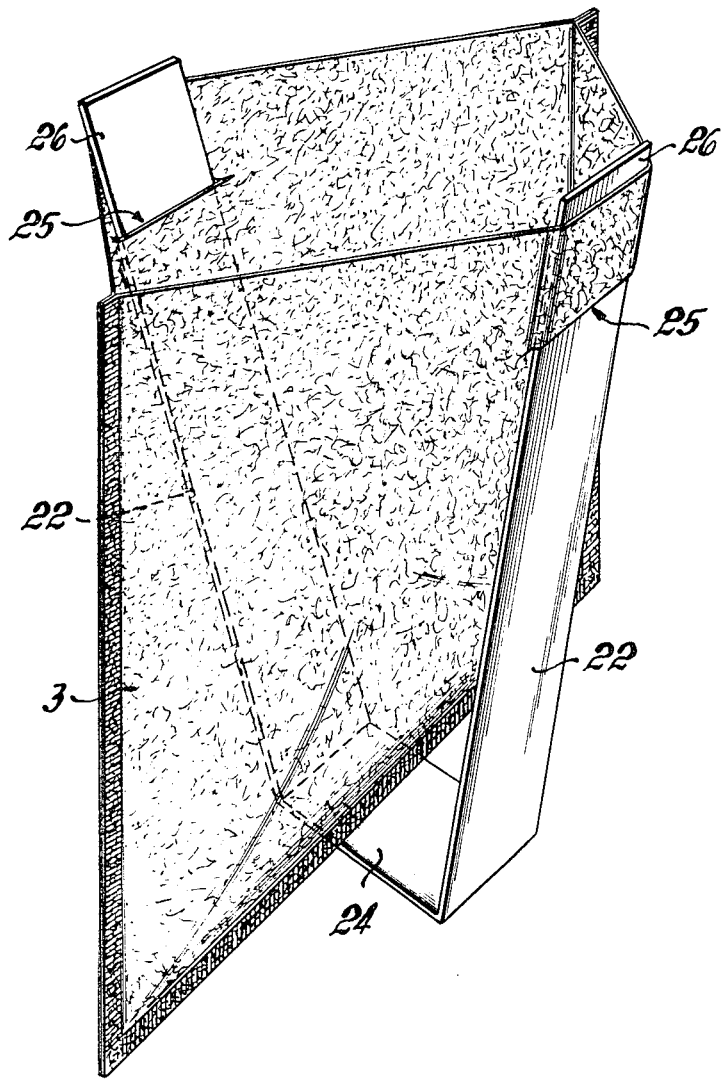

FIG. 11 shows the retaining unit of FIG. 10 inserted into a flat bag 3. However, the unit is provided at the top with two facing, horizontal slots 25. The two upper ends 26 of strips 22 are introduced from the outside, inward, up into slot 25 of flat bag 3. Flat bag 3 is thus deformed to produce a hollow body. The inset is then introduced into the pot by compressing retaining strips 22, seating it on the bottom of the pot with its bottom portion 24. Before bag is inserted into the retaining unit, strips 22 are adjusted to the requisite height of the pot. Strips 22 press outward and clamp the bag between the retaining unit and the wall of the pot. As a rule, the pots can be covered with the standard pot lid. The retaining unit can, of course, also be designed to include more than two strips.

In conclusion, the invention provides the following advantages: With regard to tea infusion, the hot water is so directed as to impinge on the pot without any previous dissipation of heat, and poured over the tea leaves stocked in the inset. The leaves are not capable of escaping. On the first infusion of hot water, they swell and rise upward, so as to adopt the diameter of the pot opening to form an actual tea leave column through which the boiling water is poured to the end. The tea leaves are opened at a temperature of 85° to 95°. In the case of loose leaves in the pot, or in the case of infusion with an infusion bag, the leaves generally open or unfold at a temperature of no more than 60° to 70° C., depending on whether the pot has been preheated or not. Due to the insertion, the tea leaves in the pot are so favorably lodged in the middle of hot water jacket, depositing without insertion a short while after the infusion, at the bottom of the pot, so that during the second stage of drawing, a maximum efficiency is achieved in the extraction. The leaves are completely and on all sides, flooded by the hot water and leached. When the pot is tilted for serving, the extract-saturated tea leaves place themselves in the inset in front of the pouring aperture so that the first to the last cup of tea is flushed by the extract-saturated leaves. One cup of tea is thus as strong as the other.

The leached leaves can be removed from the pot at any time, that is, either prior to, or after they have been served, and discarded in the sealed state, and no repeat pouring is required. Less tea is required and much labor is saved. Thus it is possible to use the less costly packaged bulk tea.

With regard to coffee infusion, a high yield is achieved. The coffee is brewed and filtered at the same time. It can be poured into the cup, crystal-clear, without using any filter, strainer, and no grounds will filter through. The filtering takes place for the most part, through the coffee batch, which is gathered in the pot. It can be influenced by the structure of the filtering paper. In accordance with the invention, double filtering can be employed, once when infusing, and secondly, when serving or pouring the coffee. The flavor is improved because the aroma is completely retained by the beverage due to its infusing into the pot, and foreign matter such as the taste of paper due to the use of cellulose base, is eliminated. The inset employed in the case of the technique pursuant to the invention consists of wet-strength blotting paper, produced of manila fiber which is tasteless and odorless. The coffee can be served hot since the infusion takes place in a short time, without requiring a hot water bath. The infusion is thus simpler than the conventional filtering technique. In the case of other infusion beverages, the advantages similar to the tea and coffee infusion are possible.

While only a few embodiments of the present invention have been shown and described, it will be understood that many changes and modifications may be made thereunto without departing from the spirit and scope of the invention.

What is claimed is:

1. A device for vessels for permitting the infusion and filtering of beverages containing residual matter comprising;

a disposable container constructed from a material capable of being infused, said container retaining the residual matter of the beverage suspended within the contents of the vessel, said container including an open top portion for securement to the inlet of the vessel, and, a conical-retaining unit having open top and bottom portions for insertion into the open top portion of said container and frictionally engaging and securing the top portion of said disposable container to the inlet opening of the vessel.

2. The device as recited in claim 1 wherein said retaining unit comprises:

a compressible cylinder constructed from an elastic flexible stock, said cylinder being opened at its top and bottom portion for securement to said vessel so that said container is capable of being slipped over the circumference of said cylinder.

3. The device as recited in claim 2 wherein said retaining unit has an adjustable circumference.

4. The device as recited in claim 3 wherein said retaining unit and said container extends slightly above the opening of the vessel.

5. The device as recited in claim 1 wherein said container comprises a flat envelope having an opening at its top portion and constructed from wet-strength blotting paper.

6. The device as recited in claim 1 wherein said container comprises a prefolded cutout capable of being introduced from the outside over the upper edge of said retaining unit.

7. The device as recited in claim 1 wherein said retaining unit comprises segment arms twisted outwardly, said retaining unit being constructed from flexible stock.

8. The device as recited in claim 7 wherein said disposable container comprises an upper part having slots for receiving said outwardly twisted segment arms.

9. The device as recited in claim 8 wherein said retaining unit comprises superimposed segments disposed on its segment arms for making said unit adjustable in height.

10. The device as recited in claim 1 wherein said retaining unit includes a lid.

* * * * *